US008774712B2

(12) United States Patent
Sato et al.

(10) Patent No.: US 8,774,712 B2
(45) Date of Patent: Jul. 8, 2014

(54) CONTACTLESS COMMUNICATION MEDIUM, ANTENNA PATTERN-PLACED MEDIUM, COMMUNICATION APPARATUS, AND ANTENNA ADJUSTING METHOD

(75) Inventors: Keisuke Sato, Miyagi (JP); Sachio Saitoh, Miyagi (JP)

(73) Assignee: Sony Corporation (JP)

( * ) Notice: Subject to any disclaimer, the term of this patent is extended or adjusted under 35 U.S.C. 154(b) by 150 days.

(21) Appl. No.: 13/066,842

(22) Filed: Apr. 26, 2011

(65) Prior Publication Data

US 2011/0275318 A1 Nov. 10, 2011

(30) Foreign Application Priority Data

May 10, 2010 (JP) ................................ P2010-108804

(51) Int. Cl.
*H04B 5/00* (2006.01)

(52) U.S. Cl.
USPC ..... 455/41.1; 455/41.2; 455/41.3; 455/575.5; 455/121; 343/748

(58) Field of Classification Search
USPC .................... 455/41.1, 41.2, 41.3, 575.5, 121; 343/748, 701, 767, 793, 867, 850, 906, 343/865; 340/10.1, 933; 29/600
See application file for complete search history.

(56) References Cited

U.S. PATENT DOCUMENTS

| | | | | |
|---|---|---|---|---|
| 5,337,063 | A * | 8/1994 | Takahira | 343/741 |
| 6,115,264 | A * | 9/2000 | Nosaka | 361/821 |
| 6,412,702 | B1 * | 7/2002 | Ishikawa et al. | 235/492 |
| 7,486,192 | B2 * | 2/2009 | Yamagajo et al. | 340/572.7 |
| 7,786,949 | B2 * | 8/2010 | Kato | 343/860 |
| 8,070,070 | B2 * | 12/2011 | Taniguchi et al. | 235/492 |
| 8,076,996 | B2 * | 12/2011 | Lee et al. | 333/117 |
| 8,279,133 | B2 * | 10/2012 | Shimoda et al. | 343/860 |
| 8,297,516 | B2 * | 10/2012 | Fukushima et al. | 235/492 |
| 2002/0011352 | A1 * | 1/2002 | Yoshisato et al. | 174/260 |
| 2002/0067316 | A1 * | 6/2002 | Yokoshima et al. | 343/895 |
| 2005/0122211 | A1 * | 6/2005 | Yoshigi et al. | 340/10.1 |
| 2005/0179552 | A1 * | 8/2005 | Shoji et al. | 340/572.7 |
| 2006/0028384 | A1 * | 2/2006 | Akiho et al. | 343/742 |
| 2006/0170607 | A1 * | 8/2006 | Yamagajo et al. | 343/803 |
| 2006/0256018 | A1 * | 11/2006 | Soler Castany et al. | 343/700 MS |

(Continued)

FOREIGN PATENT DOCUMENTS

| | | | | |
|---|---|---|---|---|
| JP | 2003-067693 A | | 3/2003 | |
| JP | 2004080600 | * | 3/2004 | H04B 1/59 |

(Continued)

OTHER PUBLICATIONS

European Search Report from EP Application No. 11161835, dated Nov. 26, 2012.

*Primary Examiner* — Temesgh Ghebretinsae
*Assistant Examiner* — MD Talukder
(74) *Attorney, Agent, or Firm* — Lerner, David, Littenberg, Krumholz & Mentlik, LLP

(57) ABSTRACT

A contactless communication medium includes a base made of an insulating material, an antenna coil section including a conductor wound in a planar shape on the base, an inductance adjusting conductor pattern that is connected in parallel to a part of the conductor in the antenna coil section, and is placed on the base, a capacitor connected to the antenna coil section, and a communication processing section that is connected to the antenna coil section and the capacitor to perform contactless communication processing.

11 Claims, 8 Drawing Sheets

(56) References Cited

U.S. PATENT DOCUMENTS

| | | | | |
|---|---|---|---|---|
| 2006/0283005 | A1* | 12/2006 | Coleman et al. | 29/600 |
| 2007/0035466 | A1* | 2/2007 | Coleman et al. | 343/895 |
| 2007/0200705 | A1* | 8/2007 | Yamagajo et al. | 340/572.7 |
| 2008/0007473 | A1* | 1/2008 | Yosui et al. | 343/788 |
| 2009/0108958 | A1* | 4/2009 | Hadano et al. | 333/175 |
| 2009/0207764 | A1* | 8/2009 | Fukamachi et al. | 370/297 |
| 2010/0182144 | A1* | 7/2010 | Yamashita et al. | 340/539.11 |
| 2010/0182211 | A1* | 7/2010 | Peters | 343/730 |
| 2010/0201457 | A1* | 8/2010 | Lee et al. | 333/117 |
| 2010/0270382 | A1* | 10/2010 | Koepp et al. | 235/492 |
| 2011/0012803 | A1* | 1/2011 | Yosui et al. | 343/788 |
| 2011/0018670 | A1* | 1/2011 | Bae et al. | 336/200 |
| 2011/0024510 | A1* | 2/2011 | Kato et al. | 235/492 |
| 2011/0049249 | A1* | 3/2011 | Kato et al. | 235/492 |
| 2011/0155810 | A1* | 6/2011 | Taniguchi et al. | 235/488 |
| 2011/0170267 | A1* | 7/2011 | Ando | 361/748 |
| 2011/0275318 | A1* | 11/2011 | Sato et al. | 455/41.1 |
| 2011/0304521 | A1* | 12/2011 | Ando et al. | 343/893 |
| 2012/0001701 | A1* | 1/2012 | Taniguchi et al. | 333/5 |
| 2012/0112979 | A1* | 5/2012 | Kato et al. | 343/853 |
| 2012/0154247 | A1* | 6/2012 | Braun et al. | 343/876 |
| 2012/0176282 | A1* | 7/2012 | Kato et al. | 343/702 |

FOREIGN PATENT DOCUMENTS

| | | | |
|---|---|---|---|
| JP | 2004080600 | A | 3/2004 |
| WO | 0184667 | A1 | 11/2001 |
| WO | 2008018413 | | 2/2008 |

* cited by examiner

CONTACTLESS COMMUNICATION MEDIUM, ANTENNA PATTERN-PLACED MEDIUM, COMMUNICATION APPARATUS, AND ANTENNA ADJUSTING METHOD

CROSS-REFERENCE TO RELATED APPLICATION

The present application claims priority from Japanese Patent Application No. JP 2010-108804 filed in the Japanese Patent Office on May 10, 2010, the entire content of which is incorporated herein by reference.

BACKGROUND OF THE INVENTION

1. Field of the Invention

The present invention relates to a contactless communication medium that performs contactless radio communication with a nearby reader/writer, an antenna pattern-placed medium included in the contactless communication medium, a communication apparatus in which the contactless communication medium is built in, and an antenna adjusting method applied to contactless radio communication.

2. Description of the Related Art

Contactless communication media called contactless IC cards are in widespread use as contactless communication media for performing contactless radio communication with a nearby reader/writer. For example, such contactless IC cards are widely used for railway ticket gate systems, bill payment systems for convenience stores, and entrance and exit control systems. Such contactless IC cards are also called radio frequency identification (RFID) or radio IC tags.

Such contactless IC cards come with an embedded IC chip, allowing for quick response and processing for purposes such as management of entrance and exit, billing, and so on. Thus, contactless IC cards are of very high utility in comparison to magnetic cards or the like.

FIGS. 8A and 8B show an example of the configuration of a contactless IC card according to the related art. FIG. 8A shows a state in which the circuit for contactless communication is placed on a resin base. A contactless IC card as the actual product has a film or the like as an outer covering material placed on its surface so that the internal circuit is hidden.

The configuration shown in FIG. 8A will be described. On the front surface of a base 10, an antenna coil section 20 is placed at a location near the outer perimeter of the base 10. The antenna coil section 20 is formed by winding a conductor pattern of a predetermined width made of a conductor such as copper or aluminum a plurality of times (about four times in this example), and placing the windings at a predetermined interval, on the front surface near the outer perimeter of the base 10.

One end 21 and the other end 22 of the antenna coil section 20 are connected to an IC chip 11, which is an integrated circuit component that performs communication processing. In this case, the one end 21 of the antenna coil section 20 is brought into electrical continuity with the back side of the base 10, and is connected to the IC chip 11 that performs communication processing, via a conductor pattern 14 on the back side. The other end 22 of the antenna coil section 20 is connected to the IC chip 11 via a conductor pattern 13.

The one end 21 and the other end 22 of the antenna coil section 20 are connected to a capacitor 12 and an adjusting capacitor 30. The capacitor 12 and the adjusting capacitor 30 are also connected by using the conductor pattern 14 on the back side.

The capacitor 12 is used to store electric charge generated by a carrier wave received by the antenna coil section 20, and obtain electric power for driving the IC chip 11. The capacitor 12 includes a first electrode section formed by a conductive pattern on the front side, and a second electrode section formed by a conductive pattern on the back side. The capacitor 12 stores electric charge on the first electrode section and the second electrode section that are opposed to each other via the base 10. Each of the electrode sections forming the capacitor 12 has a relatively large area so as to enable storage of relatively large electric charge.

The adjusting capacitor 30 is used for the purpose of changing resonant frequency. The adjusting capacitor 30 includes a first conductor pattern 31 on the front side which is connected to the other end 22 of the antenna coil section 20, and a second conductor pattern 32 on the back side which is connected to the conductor pattern 14. The first conductor pattern 31 on the front side is placed in comb-tooth form, and the second conductor pattern 32 on the back side is placed so as to orthogonally intersect the comb-toothed portion. Electric charge is stored at their orthogonal intersections. The adjusting capacitor 30 is a small capacitance capacitor in comparison to the capacitor 12. The adjusting capacitor 30 is provided for the purpose of cutting off the comb-toothed conductor pattern partway to reduce the capacitor's capacitance when adjusting resonant frequency during the manufacturing process of the contactless IC card, thereby raising resonant frequency.

FIG. 8B shows an equivalent circuit of the configuration of the contactless IC card shown in FIG. 8A.

As shown in FIG. 8B, the IC chip 11, the capacitor 12, and the adjusting capacitor 30 are connected in parallel to the antenna coil section 20.

An adjustment process to raise resonant frequency with the adjusting capacitor 30 is performed by cutting off the first conductor pattern 31 and the second conductor pattern 32 partway. This process is performed by, for example, boring a hole all the way through the base 10 at the cutting location of the first conductor pattern 31, and drawing out the first conductor pattern 31 or the second conductor pattern 32.

This adjustment process of resonant frequency during the manufacturing process is performed automatically using an adjusting apparatus (not shown). The adjusting apparatus is configured to previously hold data on the cutting position for correcting the resonant frequency of the communication medium, determine the cutting position on the basis of the actually measured resonant frequency, and adjust the resonant frequency by boring a hole in the base at the determined position. Through this adjustment, a contactless IC card with an appropriate resonant frequency can be provided.

FIGS. 9A and 9B show an example of configuration with a center tap, different from the example shown in FIGS. 8A and 8B.

The configuration shown in FIG. 9A will be described. On the front surface of the base 10, the antenna coil section 20 formed by winding a conductor pattern a plurality of times is placed at a location near the outer perimeter of the base 10. The one end 21 and the other end 22 of the antenna coil section 20 are connected to the IC chip 11, which is an integrated circuit component that performs communication processing. The one end 21 of the antenna coil section 20 is connected to the IC chip 11 that performs communication processing, via the conductor pattern 14 on the back side.

On the back side, the capacitor 12 is connected to the one end 21 of the antenna coil section 20. On the front side, the capacitor 12 is connected to an end 24 of an antenna extension 23 that is extended from the other end 22 of the antenna coil section 20.

For the adjusting capacitor 30 as well, the conductor pattern 14 on the back side is connected to the second conductor pattern 32, and the end 24 on the front side is connected to the first conductor pattern 31.

FIG. 9B shows an equivalent circuit of the configuration of the contactless IC card shown in FIG. 9A.

As shown in FIG. 9B, the IC chip 11 is connected to the antenna coil section 20, and the capacitor 12 and the adjusting capacitor 30 are connected via the antenna coil section 20 and the antenna extension 23. The other end 22 that is the connecting point of the antenna coil section 20 and the antenna extension 23 serves as a center tap. The adjustment process with the adjusting capacitor 30 is the same as that in the example shown in FIGS. 8A and 8B.

In the case of the configuration shown in FIGS. 9A and 9B, by making an adjustment using the adjusting capacitor 30, it is possible to change the overall inductance value without changing the value of inductance connected to the IC chip 11. In the case of the example shown in FIGS. 9A and 9B as well, an adjustment to raise resonant frequency is made.

Japanese Unexamined Patent Application Publication No. 2003-67693 describes about a configuration for performing communication using a contactless IC card.

SUMMARY OF THE INVENTION

The problem with this kind of contactless IC card is that even slight errors introduced during manufacture, such as slight variations in line spacing, line width, or the like when forming the antenna pattern, or variations in the thickness of the base, make the resonant frequency of the antenna nonuniform. Adjustment during the manufacturing process is thus important.

As a resonant frequency adjustment made for contactless IC cards according to the related art, in both of the configurations shown in FIGS. 8A and 8B and FIGS. 9A and 9B, the unnecessary portion of the adjusting capacitor 30 is detached from the circuit to reduce the capacitor's capacitance, thereby increasing resonant frequency. The reduction in the capacitor's capacitance can be done by boring a hole in the base 10 at the location where the adjusting capacitor 30 is placed, and thus can be performed relatively easily through an automatic adjustment process.

In contrast, it is not practically possible to make an adjustment to lower resonant frequency. When it is necessary to lower resonant frequency, it is necessary to add a capacitor to the circuit, for example, it is necessary to mount a capacitor by soldering or the like, which is extremely cumbersome. When a contactless IC card that makes it necessary to lower resonant frequency is produced during manufacture of contactless IC cards according to the related art, such a contactless IC card is regarded as a non-conforming product.

Also, a contactless IC card is sometimes used in situations where a magnetic sheet made of a magnetic material is brought into close proximity to the contactless IC card in order to improve antenna characteristics. Although placing a component such as a magnetic sheet in this way can improve radio communication characteristics, there is a possibility that the resonant frequency of the contactless IC card as a whole may change due to the influence of the component that has been placed.

When the resonant frequency of the contactless IC card as a whole changes due to mounting of such another component, it is necessary to adjust the resonant frequency again. Even if an adjustment to lower the resonant frequency becomes necessary at that time, as described above, such an adjustment to lower the resonant frequency is not practically possible.

It is desirable to increase the degree of freedom of adjustment for varying resonant frequency in a contactless IC card.

According to an embodiment of the present invention, there is provided a contactless communication medium including a base made of an insulating material, an antenna coil section including a conductor wound in a planar shape on the base, a capacitor connected to the antenna coil section, a communication processing section that is connected to the antenna coil section and the capacitor to perform contactless communication processing, and an inductance adjusting conductor pattern that is connected in parallel to a part of the conductor in the antenna coil section and is placed on the base.

With the provision of the inductance adjusting conductor pattern, by performing an adjusting operation of cutting off this inductance adjusting conductor pattern partway, the area of the antenna opening changes, thereby enabling an adjustment to increase inductance value. As this adjustment to increase inductance value is made, an adjustment to lower the resonant frequency of the antenna becomes possible.

DESCRIPTION OF THE PREFERRED EMBODIMENTS

Embodiments of the present invention will be described in the following order.

1. Example of the configuration of a medium according to an embodiment (FIGS. 1A and 1B and FIG. 2)
2. Example of overall configuration (FIG. 3 and FIG. 4)
3. Example of trimming for adjustment (FIGS. 5A to 5C)
4. Another example of inductance adjusting circuit (FIG. 6)

Figure 7:
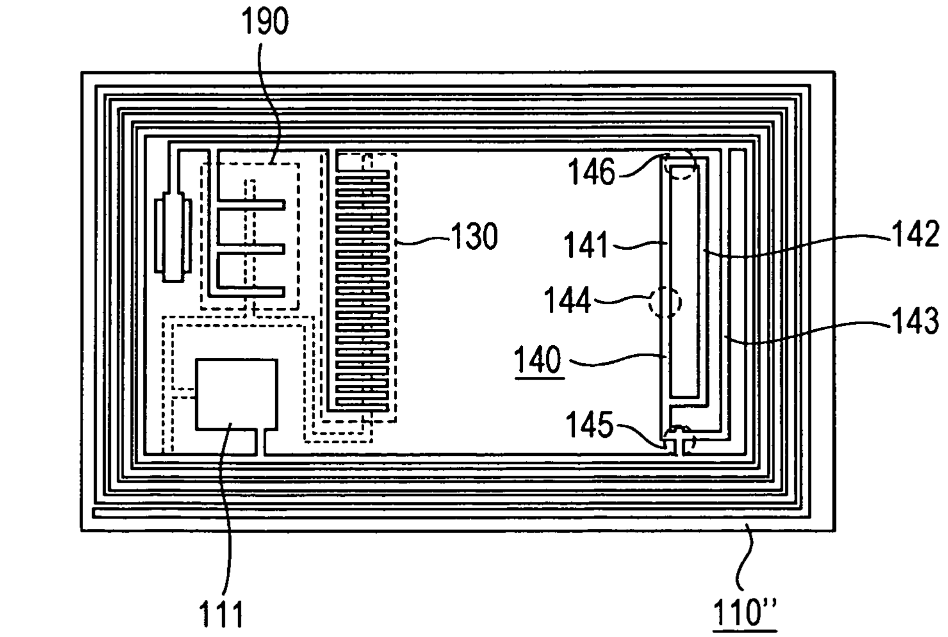
FIG. 7 is a plan view showing still another example (example with a plurality of adjusting capacitors) of a contactless communication medium according to an embodiment of the present invention.

5. Example where a plurality of adjusting capacitors are provided (FIG. 7)

6. Other modifications

[1. Example of the Configuration of a Medium According to an Embodiment]

Hereinbelow, the configuration of a contactless IC card according to this embodiment will be described with reference to FIGS. 1A and 1B and FIG. 2. In this embodiment, a conductor pattern is placed on a base made of a resin sheet to form an antenna pattern-placed medium, and then components such as an IC chip are further mounted, thereby forming a contactless communication medium 110. As will be described later, another sheet or the like is placed on the front and back of the base of the contactless communication medium 110, thereby completing a contactless IC card.

Figure 1A:
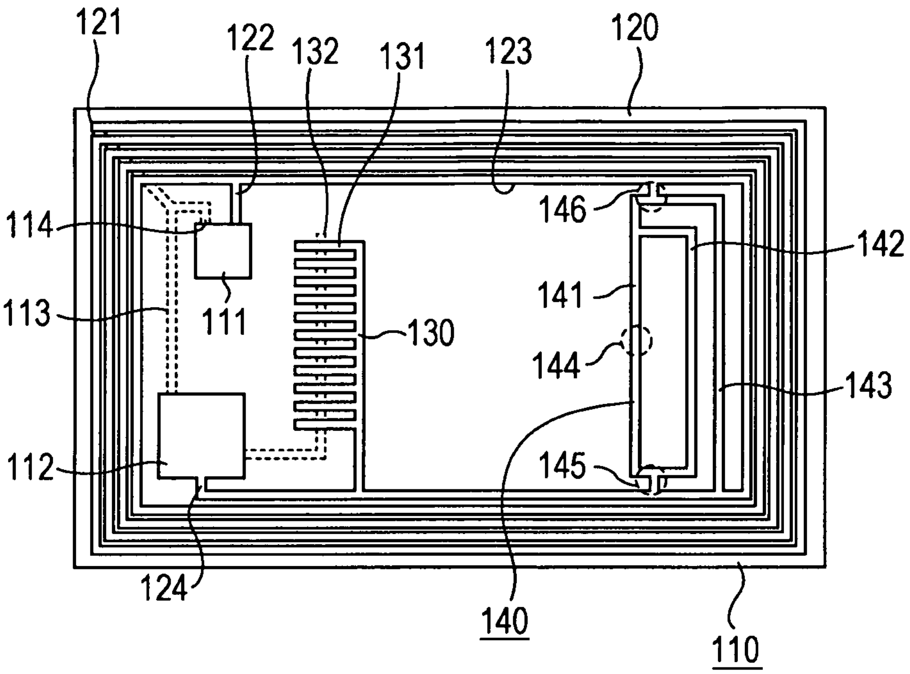
FIGS. 1A and 1B are a plan view and an equivalent circuit diagram, respectively, showing an example of configuration according to an embodiment of the present invention.

FIG. 1A is a plan view of the front side of the contactless communication medium 110. FIG. 2 shows a front surface 110*a* and a back surface 110*b* of the contactless communication medium 110. It should be noted, however, that to facilitate understanding of its correspondence to the front surface, the back surface 110*b* shown in FIG. 2 is a back surface as viewed from the front side. When the back surface is actually viewed, the back surface is upside down from what is shown in FIG. 2.

Figure 1B:
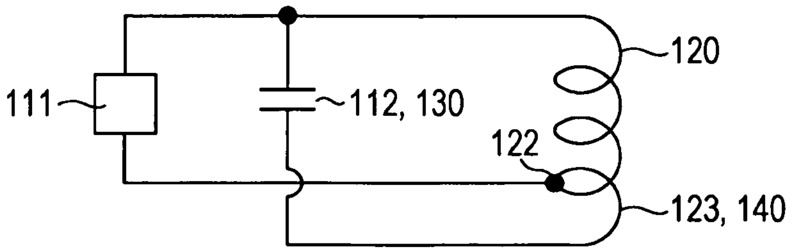
Figure 2:
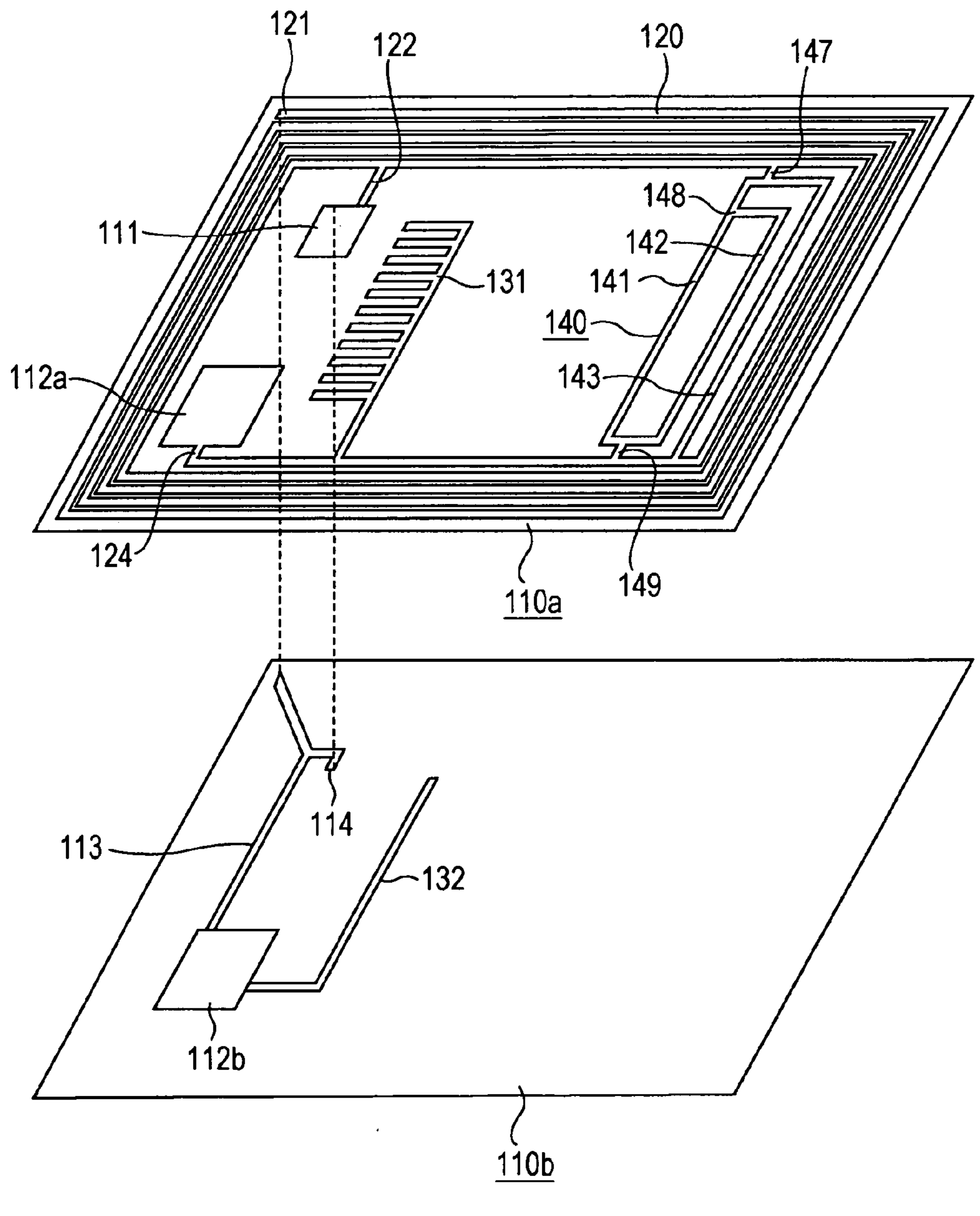
FIG. 2 is a perspective view showing the front surface and back surface of a contactless communication medium according to an embodiment of the present invention.

As shown in FIGS. 1A and 1B and FIG. 2, the contactless communication medium 110 is formed by a rectangular base similar to various kinds of cards or the like. On the front surface of the contactless communication medium 110, an antenna coil section 120 is placed at a location near the outer perimeter of the contactless communication medium 110. The antenna coil section 120 is formed by placing and winding a conductor pattern of a predetermined width made of a conductor such as copper or aluminum a plurality of times (about four times in this example), on the front surface near the outer perimeter of the contactless communication medium 110.

One end 121 and the other end 122 of the antenna coil section 120 are connected to an IC chip 111, which is an integrated circuit component that performs communication processing. In this case, the one end 121 of the antenna coil section 120 is brought into electrical continuity with the back side of the base, and is connected to the IC chip 111 that performs communication processing, via a conductor pattern 113 on the back side. As shown in FIG. 2, the conductor pattern 113 on the back side is connected to the IC chip 111 by being brought into electrical continuity with the front side from the back side of the base at an IC chip connecting part 114. The other end 122 of the antenna coil section 120 is directly connected to the IC chip 111.

The one end 121 and the other end 122 of the antenna coil section 120 are connected to a capacitor 112 and an adjusting capacitor 130. On the back side of the base, the capacitor 112 is connected to the one end 121 of the antenna coil section 120 via the conductor pattern 113. On the front side, the capacitor 112 is connected to an end 124 of an antenna extension 123 that is extended from the other end 122 of the antenna coil section 120.

The capacitor 112 is used to store electric charge generated by a carrier wave received by the antenna coil section 120, and obtain electric power for driving the IC chip 111. As shown in FIG. 2, the capacitor 112 includes a first electrode section 112*a* formed by a conductive pattern on the front side, and a second electrode section 112*b* formed by a conductive pattern on the back side. The capacitor 112 stores electric charge on the first electrode section 112*a* and the second electrode section 112*b* that are opposed to each other via the base. Each of the electrode sections 112*a* and 112*b* forming the capacitor 112 has a relatively large area so as to enable storage of relatively large electric charge.

The adjusting capacitor 130 is used for the purpose of changing resonant frequency. As shown in FIG. 2, the adjusting capacitor 130 includes a first conductor pattern 131 on the front side which is connected to the other end 122 of the antenna coil section 120, and a second conductor pattern 132 on the back side which is connected to the second electrode section 112*b*. The first conductor pattern 131 on the front side is made up of a plurality of conductor patterns placed in a comb-tooth arrangement, and the second conductor pattern 132 on the back side is placed so as to orthogonally intersect the comb-toothed portion. Electric charge is stored at their orthogonal intersections. The adjusting capacitor 130 is a small capacitance capacitor in comparison to the capacitor 112. The adjusting capacitor 30 is provided for the purpose of cutting off the comb-toothed conductor pattern partway to reduce the capacitor's capacitance when adjusting resonant frequency during the manufacturing process of the contactless IC card, thereby raising resonant frequency.

Figure 9A:
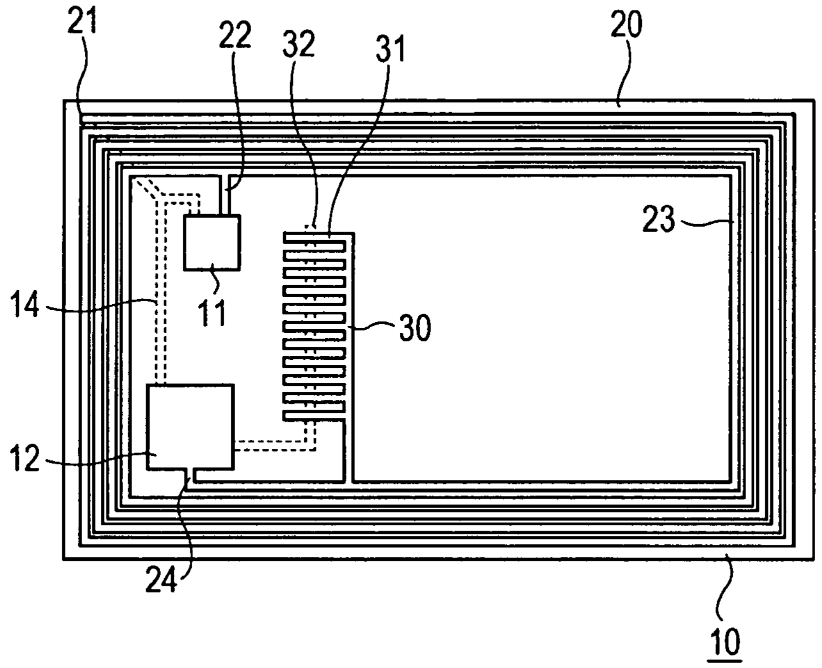
FIGS. 9A and 9B are a plan view and an equivalent circuit diagram, respectively, showing another example (example with a center tap) of a contactless IC card according to the related art.
Figure 9B:
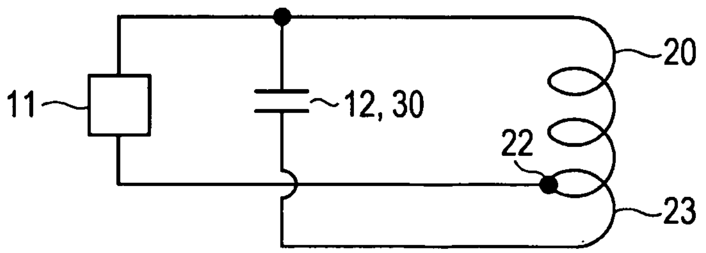

The configuration up to this point is the same as that of the contactless IC card according to the related art shown in FIGS. 9A and 9B.

In this embodiment, an inductance adjusting circuit 140 is connected partway along the antenna extension 123 of the antenna coil section 120. The extension 123 of the antenna coil section 120 is the antenna pattern located at the innermost perimeter of the antenna coil section 120. A conductor pattern forming the inductance adjusting circuit 140 is connected in parallel to a portion partway along the antenna extension 123 located at the innermost perimeter.

As shown in FIG. 1A and FIG. 2, in the inductance adjusting circuit 140, three conductor patterns 141, 142, and 143 are connected in parallel.

As shown in FIG. 2, one end side of each of a first conductor pattern 141 and a third conductor pattern 143 is connected, at a common connecting point 147, to the conductor pattern forming the antenna extension 123 of the antenna coil section 120. One end of the second conductor pattern 142 is connected to a connecting point 148 located near the one end of the first conductor pattern 141.

The other end side of each of the first conductor pattern 141 and the third conductor pattern 143 is connected, at a common connecting point 149, to the conductor pattern forming the antenna extension 123 of the antenna coil section 120.

The other end of the third conductor pattern 143 is directly connected to the conductor pattern forming the antenna extension 123 of the antenna coil section 120.

It should be noted that as shown in FIG. 1A, the substantially midway position of the first conductor pattern 141 serves as a trimming position 144, the vicinity of the connecting point 149 serves as a trimming position 145, and the vicinity of the connecting point 147 serves as a trimming position 146. Each of the trimming positions 144, 145, and 146 is a position at which the conductor pattern is trimmed when adjusting inductance, and will be described later in detail.

FIG. 1B shows an equivalent circuit of the circuit of the contactless communication medium 110 shown in FIG. 1A and FIG. 2.

As shown in FIG. 1B, the IC chip 111 is connected to the antenna coil section 120, and the capacitor 112 and the adjusting capacitor 130 are connected via the antenna coil section 120 and the antenna extension 123. The other end 122 that is the connecting point of the antenna coil section 120 and the antenna extension 123 serves as a center tap.

The inductance adjusting circuit 140 is connected selectively in parallel to the antenna extension 123 of the antenna coil section.

According to this embodiment, the capacitor's capacitance value can be adjusted using the adjusting capacitor 130, and the inductance value of the antenna coil section 120 can be also adjusted using the inductance adjusting circuit 140. Details of these adjustment processes will be described later.

[2. Example of Overall Configuration]

Next, an example of the overall configuration of a contactless IC card including the contactless communication medium 110 described in the foregoing will be described.

Figure 3:
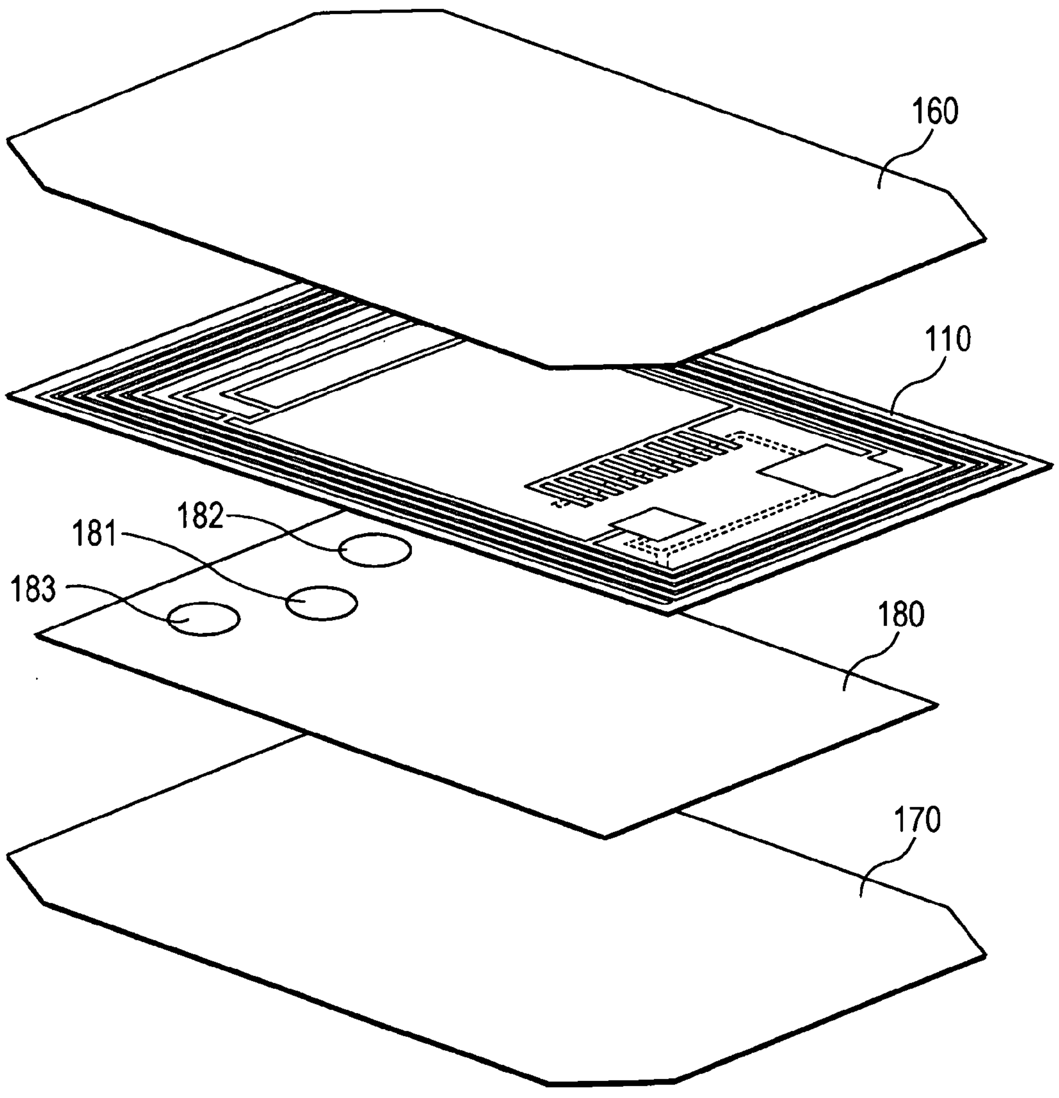
FIG. 3 is an exploded perspective view showing the overall configuration of a contactless communication medium according to an embodiment of the present invention.

FIG. 3 is an exploded view of the entire contactless IC card. The contactless IC card has an outer covering material 160 placed on the front surface of the contactless communication medium 110. While the outer covering material 160 is made of a relatively thick resin material, the outer covering material 160 may be made of a thin resin sheet.

A magnetic sheet 180 and an adhesive sheet 170 are placed in order on the back surface of contactless communication medium 110. These components are integrated together, and assembled into a contactless IC card.

The magnetic sheet 180 has such a size that is the same as at least the base forming the contactless communication medium 110 and allows the magnetic sheet 180 to cover the entire antenna coil section 120. The magnetic sheet 180 is provided with through holes 181, 182, and 183 at positions corresponding to the respective trimming positions 144, 145, and 146 of the contactless communication medium 110.

Figure 4:
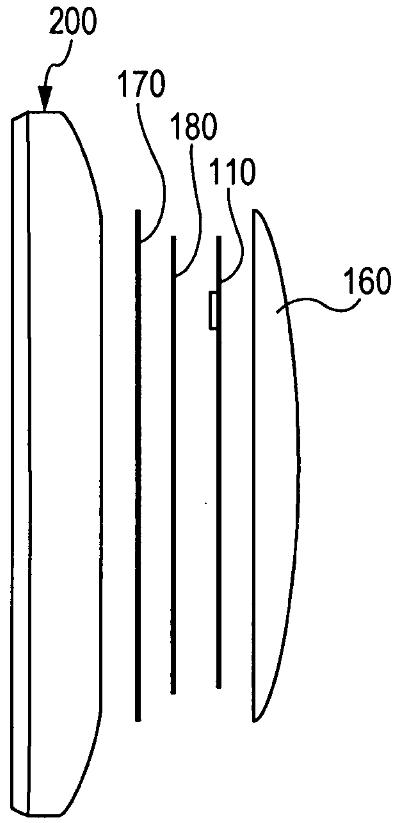
FIG. 4 is an exploded side view showing a state in which a contactless communication medium according to an embodiment of the present invention is combined with a terminal apparatus.

With the provision of the adhesive sheet 170 on the back side in this way, the contactless IC card can be easily mounted to another electronic device for assembly into a communication apparatus. That is, as shown in FIG. 4, for example, the contactless IC card according to this embodiment can be affixed to the back of a terminal apparatus 200 such as a mobile phone terminal, a smart phone, an information terminal, or an AV player, thereby assembling a communication apparatus with contactless communication capability. In this case, when performing contactless communication by bringing the contactless IC card into close proximity with a reader/writer (not shown), the provision of the magnetic sheet 180 allows such contactless communication to be performed in a favorable manner without being obstructed by the circuitry inside the terminal apparatus 200.

[3. Example of Trimming for Adjustment]

Next, a description will be given of adjustment of resonant frequency in the non-contact IC card according to this embodiment.

As described above with reference to FIGS. 1A and 1B and FIG. 2, the contactless communication medium 110 includes the adjusting capacitor 130 and the inductance adjusting circuit 140, as components for adjusting resonant frequency.

As described above in the Description of the Related Art section, the adjusting capacitor 130 is provided for the purpose of disconnecting a part or the entirety of the capacitor portion of the adjusting capacitor 130 to reduce capacitance value, thereby raising resonant frequency to achieve a specified resonant frequency. When manufacturing the contactless communication medium 110 according to this embodiment, first, the resonant frequency of the antenna is adjusted by using the adjusting capacitor 130. This adjustment is made in the state when the contactless communication medium 110 exists alone, without the magnetic sheet 180 or the like shown in FIG. 3 being attached. The adjustment using the adjusting capacitor 130 is a process of raising resonant frequency.

Thereafter, the magnetic sheet 180 is affixed to the back surface of the contactless communication medium 110, and the resonant frequency of the antenna of the contactless communication medium 110 is measured again. At this time, depending on the case, the resonant frequency may either become higher or lower in comparison to a specified resonant frequency due to the influence of the magnetic sheet 180.

When the resonant frequency is lower than a specified frequency, an adjustment is made again by using the remaining portion (the still connected portion) of the adjusting capacitor 130.

When the resonant frequency is higher than a specified frequency, the higher frequency is corrected. This process is performed by boring a through hole at either one of the three trimming positions 144, 145, and 146 within the inductance adjusting circuit 140 to change the state of connection of the conductor patterns 141, 142, and 143.

Figure 5A:
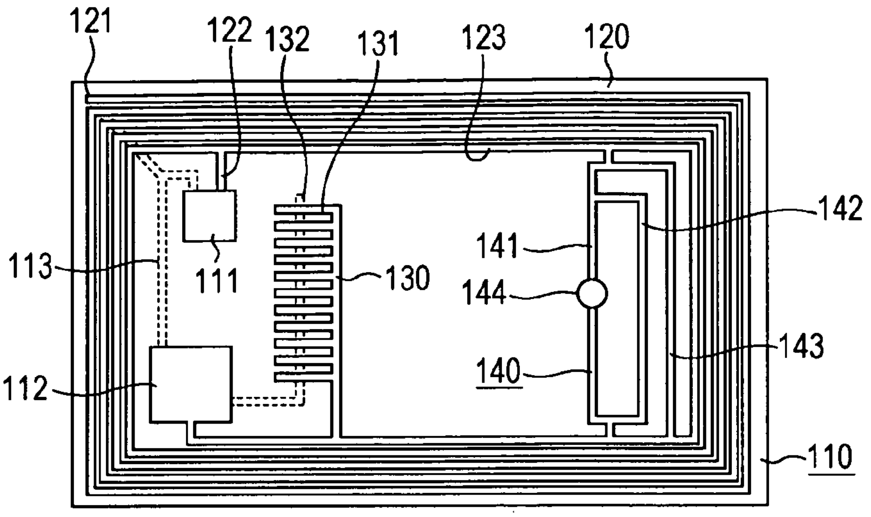
FIGS. 5A to 5C are explanatory views each showing an example of cutting position of a contactless communication medium according to an embodiment of the present invention.
Figure 5B:
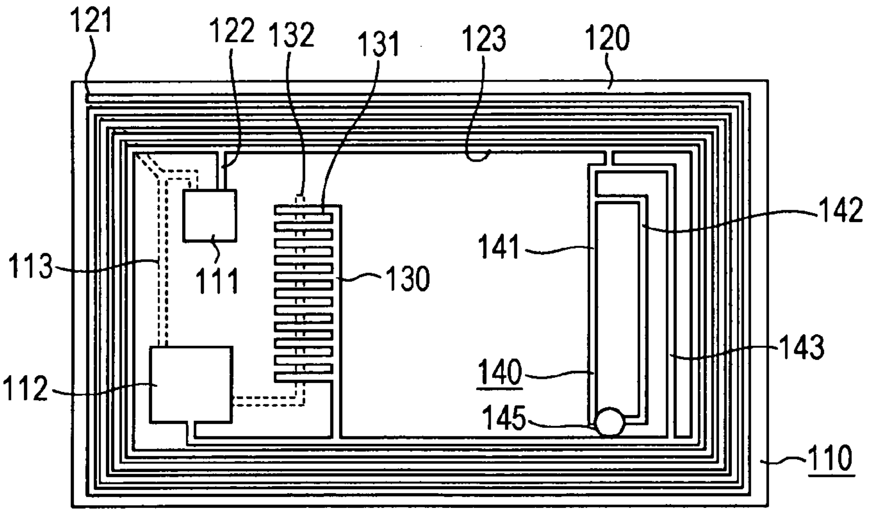
Figure 5C:
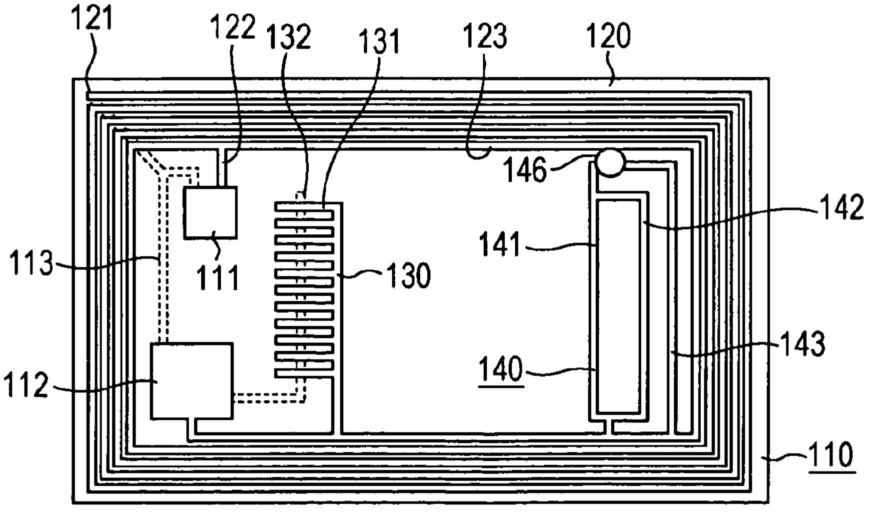
Figure 6:
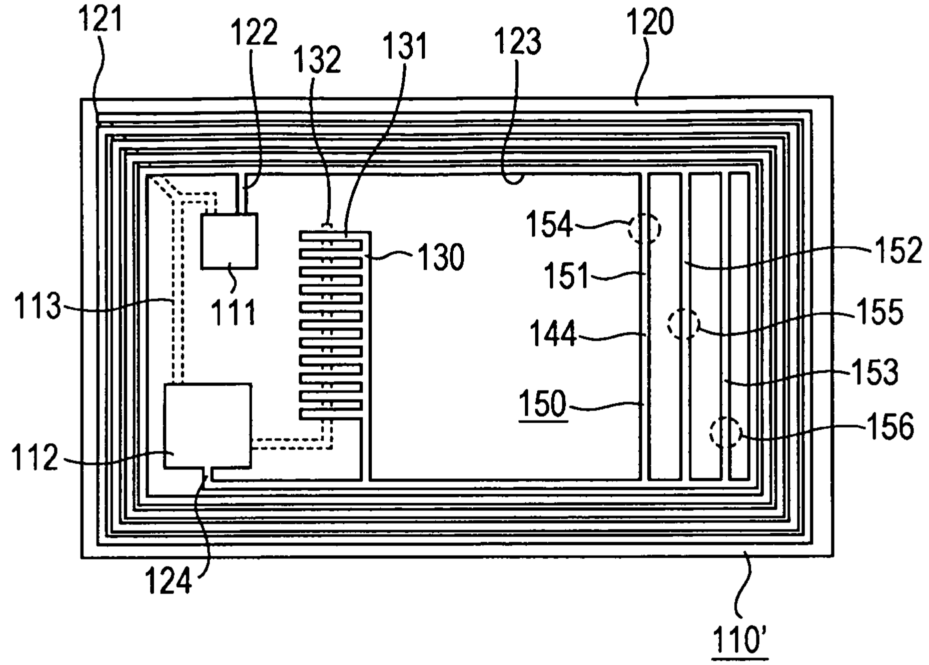
FIG. 6 is a plan view showing another example (different example of an adjusting circuit pattern) of a contactless communication medium according to an embodiment of the present invention.

FIGS. 5A to 5C show an example in which the state of connection of the conductor patterns 141, 142, and 143 is changed by boring a through hole at each of the three trimming positions 144, 145, and 146.

FIG. 5A shows an example in which the first conductor pattern 141 is disconnected by forming a through hole at the trimming position 144 located partway along the first conductor pattern 141. In this state, the second conductor pattern 142 and the third conductor pattern 143 are connected in parallel to the antenna extension 123 of the antenna coil section 120, and the resonant frequency becomes lower as the first conductor pattern 141 is disconnected.

FIG. 5B shows an example in which the first conductor pattern 141 and the second conductor pattern 142 are disconnected by forming a through hole at the trimming position 145 that is located at the connecting point 149 of the first conductor pattern 141 and the second conductor pattern 142. In this state, only the third conductor pattern 143 is connected in parallel to the antenna extension 123 of the antenna coil section 120, and the resonant frequency becomes lower as the first conductor pattern 141 and the second conductor pattern 142 are disconnected.

FIG. 5C shows an example in which all of the conductor patterns 141, 142, and 143 are disconnected by forming a through hole at the trimming position 146 that is located at the connecting point 147 of the conductor patterns 141, 142, and 143. In this case, the resonant frequency becomes lower as all of the conductor patterns 141, 142, and 143 are disconnected.

In this way, an adjustment can be made in such a manner that the degree to which resonant frequency is lowered can be varied between the states of FIG. 5A, FIG. 5B, and FIG. 5C. Thus, an adjustment to lower resonant frequency can be made in a plurality of stages.

Therefore, according to this embodiment, not only an adjustment to raise resonant frequency but also an adjustment to lower resonant frequency is possible. Thus, differences in characteristics due to variations of the individual components of the product can be accurately adjusted for. In particular, since the adjustment is possible even after attachment of the magnetic sheet 180, it is possible to obtain a contactless IC card with magnetic sheet which has favorable characteristics.

It should be noted that a resonant frequency adjustment using a capacitor has a disadvantage in that since the capacitance (plate area) of the capacitor varies due to the influence of variations in line spacing of the antenna pattern, variations also tend to occur in the amount of adjustment of resonant frequency (Δf0). In this regard, the inductance adjustment using the inductance adjusting circuit 140 according to this embodiment has an advantage in that even if variations occur in pattern line spacing, the number of coil windings in the antenna coil section does not change, so there is relatively little variation in the amount of resonant frequency adjustment (Δf0). When variations in resonant frequency adjustment using the capacitor and resonant frequency adjustment based on trimming of the antenna coil were measured and compared for the final product, it was found as a result that the resonant frequency adjustment based on trimming of the antenna coil reduces the variations by approximately 35%.

It should be noted that since the conductor patterns 141, 142, and 143 are connected in the manner as shown in FIG. 2 in this embodiment, in the case of making an adjustment in three stages, the adjustment can be made in any stage solely by boring a hole at one of the corresponding locations, thereby allowing the adjustment to be made in a favorable manner with few operations.

When boring a through hole at each of the trimming positions 144, 145, and 146, since the through holes 181, 182 and 183 are provided in advance at the positions in the magnetic sheet 180 corresponding to the respective trimming positions as shown in FIG. 3, it is unnecessary to bore out the corresponding portion of the magnetic sheet 180. Therefore, it is only necessary to bore out the corresponding portion of the base forming the contactless communication medium 110. Thus, a hole can be bored relatively easily, allowing good workability.

[4. Another Example of Inductance Adjusting Circuit]

An example of circuit configuration different from that of the inductance adjusting circuit 140 shown in FIGS. 1A and 1B and FIG. 2 is shown in FIG. 6. In an inductance adjusting circuit 150 included in a contactless communication medium 110' according to this example, a first conductor pattern 151, a second conductor pattern 152, and a third conductor pattern 153 are individually connected to the antenna extension 123 of the antenna coil section 120. Trimming positions 154, 155, and 156 are provided partway along the conductor patterns 151, 152, and 153, respectively.

The contactless communication medium 110' shown in FIG. 6 is otherwise configured in the same manner as the contactless communication medium 110 shown in FIGS. 1A and 1B and FIG. 2.

The inductance adjusting circuit 150 in the example shown in FIG. 6 is also configured as an inductance adjusting circuit including three conductor patterns, thus enabling inductance to be adjusted in at least three stages in the same manner as in the example shown in FIGS. 1A and 1B.

It should be noted, however, that in this case, the trimming positions 154, 155, and 156 are individually provided for the respective conductor patterns. Thus, for example, to disconnect all of the three conductor patterns 151, 152, and 153, it is necessary to bore a hole at all of the trimming positions 154, 155, and 156.

[5. Example Where a Plurality of Adjusting Capacitors Are Provided]

In the example shown in FIG. 7, a plurality of adjusting capacitors are provided.

That is, in a contactless communication medium 110", a second adjusting capacitor 190 is provided in addition to the adjusting capacitor 130, thereby allowing capacitance value to be varied independently with each of the adjusting capacitors 130 and 190. The contactless communication medium 110" is otherwise configured in the same manner as the contactless communication medium 110 shown in FIGS. 1A and 1B and FIG. 2.

Providing the plurality of adjusting capacitors in this way can also increase the degree of freedom of adjustment. For example, the adjustment using the adjusting capacitor 130 can be made prior to affixing a magnetic sheet, and after the magnetic sheet is affixed, adjustment can be performed by using the second adjusting capacitor 190 and the inductance adjusting circuit 140.

[6. Other Modifications]

Figure 8A:
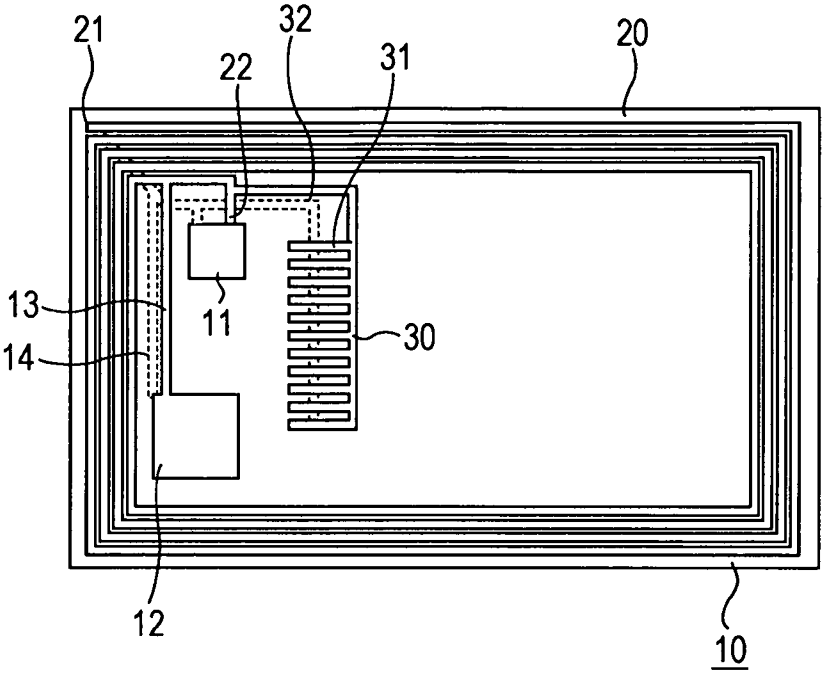
FIGS. 8A and 8B are a plan view and an equivalent circuit diagram, respectively, showing an example of a contactless IC card according to the related art.
Figure 8B:
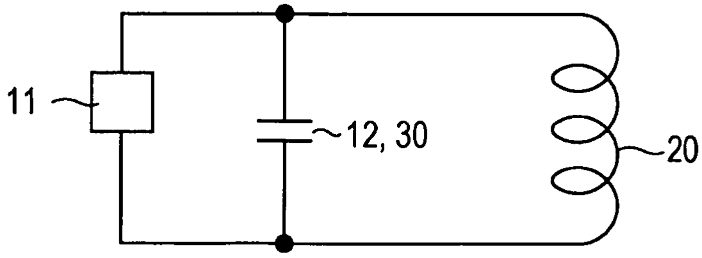

In the embodiment shown in FIGS. 1A and 1B or the like, the inductance adjusting circuit 140 or the like is provided in the case of a configuration with a so-called center tap (configuration shown in FIGS. 9A and 9B). When adjusting the antenna coil, adopting this center tap scheme makes it possible to adjust only the coil (inductance value) on the outside of the coil connected to the IC, thereby reducing the influence of the communication distance or the like on communication characteristics. In contrast, in the case of the configuration with no center tap shown in FIGS. 8A and 8B as well, the inductance adjusting circuit 140 may be provided partway along the antenna coil section to enable adjustment of resonant frequency.

While in the above example the inductance adjusting circuit is provided with three conductor patterns, one or two, or three or more conductor patterns may be placed.

Furthermore, while the conductor patterns 141, 142, and 143 of the inductance adjusting circuit 140 shown in FIG. 1A or the like are positioned near the right end of the antenna coil section 120 as seen in FIG. 1A, for example, the substantially central portion of the antenna coil section 120 may be connected by the conductor patterns 141, 142, and 143.

While in the above-described embodiment both the mechanism for adjustment using a capacitor and the mechanism for adjustment on the antenna coil pattern side are provided, adjustment may be performed by using only the inductance adjusting circuit 140, and the adjusting capacitor 130 may be omitted.

According to an embodiment of the present invention, by performing an adjusting operation of cutting off the inductance adjusting conductor pattern partway, an adjustment to increase inductance value is made, thereby enabling an adjustment to lower the resonant frequency of the antenna. Therefore, when an adjustment to lower the resonant frequency of the antenna becomes necessary for the contactless communication medium, this can be easily handled by cutting off of the adjusting conductor pattern, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A contactless communication medium comprising:
- a base made of an insulating material;
- an antenna coil section including a conductor wound in a planar shape on the base;
- an inductance adjusting circuit that is connected to a part of the conductor in the antenna coil section, and is placed on the base;
- a capacitor connected to the antenna coil section; and
- a communication processing section that is connected to the antenna coil section and the capacitor to perform contactless communication processing,
- in which the inductance adjusting circuit has a first conductor pattern, a second conductor pattern, and a third conductor pattern connected in parallel such that (i) one end of each of the first conductor pattern and the third conductor pattern are connected at a first connecting point to the antenna coil section, (ii) one end of the second conductor pattern is connected to the first conductor pattern at a second connecting point which is located between ends of the first conductor pattern and by the one end of the first conductor pattern, (iii) another end of each of the first conductor pattern and the second conductor pattern are connected at a third connecting point to the antenna coil section, and (iv) another end of the third conductor pattern is directly connected to the antenna coil section.

2. The contactless communication medium according to claim 1, wherein the capacitor includes an adjusting capacitor that adjusts an inductance.

3. The contactless communication medium according to claim 2, wherein an adjustment to increase an inductance value is made by trimming some or all of the first conductor pattern, the second conductor pattern, and the third conductor pattern.

4. The contactless communication medium according to claim 3, wherein the communication processing section is actuated by electric power received by the antenna coil section and stored in the capacitor.

5. The contactless communication medium according to claim 4, further comprising:

a magnetic sheet that is placed so as to overlap the base, and has a through hole provided at a position where the cutting off is done.

6. An antenna pattern-placed medium comprising:

a base made of an insulating material;

an antenna coil section including a conductor wound in a planar shape on the base; and an inductance adjusting circuit that is connected to a part of the conductor in the antenna coil section, in which the inductance adjusting circuit has a first conductor pattern, a second conductor pattern, and a third conductor pattern connected in parallel such that (i) one end of each of the first conductor pattern and the third conductor pattern are connected at a first connecting point to the antenna coil section, (ii) one end of the second conductor pattern is connected to the first conductor pattern at a second connecting point which is located by the one end of the first conductor pattern, (iii) another end of each of the first conductor pattern and the second conductor pattern are connected at a third connecting point to the antenna coil section, and (iv) another end of the third conductor pattern is directly connected to the antenna coil section.

7. A communication apparatus comprising:

a base made of an insulating material;

an antenna coil section including a conductor wound in a planar shape on the base;

an inductance adjusting circuit that is connected to a part of the conductor in the antenna coil section, and is placed on the base;

a capacitor connected to the antenna coil section; and a communication processing section that is connected to the antenna coil section and the capacitor to perform contactless communication processing, in which the inductance adjusting circuit has a first conductor pattern, a second conductor pattern, and a third conductor pattern connected in parallel such that (i) one end of each of the first conductor pattern and the third conductor pattern are connected at a first connecting point to the antenna coil section, (ii) one end of the second conductor pattern is connected to the first conductor pattern at a second connecting point which is located by the one end of the first conductor pattern, (iii) another end of each of the first conductor pattern and the second conductor pattern are connected at a third connecting point to the antenna coil section, and (iv) another end of the third conductor pattern is directly connected to the antenna coil section.

8. An antenna adjusting method comprising:

placing an antenna coil section by winding a conductor in a planar shape, on a base made of an insulating material;

connecting an inductance adjusting circuit to a part of the conductor in the antenna coil section, in which the inductance adjusting circuit has a first conductor pattern, a second conductor pattern, and a third conductor pattern connected in parallel such that (i) one end of each of the first conductor pattern and the third conductor pattern are connected at a first connecting point to the antenna coil section, (ii) one end of the second conductor pattern is connected to the first conductor pattern at a second connecting point which is located by the one end of the first conductor pattern, (iii) another end of each of the first conductor pattern and the second conductor pattern are connected at a third connecting point to the antenna coil section, and (iv) another end of the third conductor pattern is directly connected to the antenna coil section; and making an adjustment to increase an inductance value by trimming some or all of the three conductor patterns.

9. The contactless communication medium according to claim 1, in which a midway point on the first conductor pattern is a first trimming position, the third connecting point is a second trimming position, and the first connecting point is a third trimming position, and in which any one or ones of the first trimming position, the second trimming position, and the third trimming position are usable to adjust an inductance value of the inductance adjusting circuit.

10. The contactless communication medium according to claim 1, in which a point on the first conductor pattern located between the second connecting point and the third connecting point is a first trimming position, the third connecting point is a second trimming position, and the first connecting point is a third trimming position.

11. The contactless communication medium according to claim 10, in which when only the first trimming position is removed the first conductor pattern is disconnected such that the second conductor pattern and the third conductor pattern remain connected to the antenna coil section, when only the second trimming position is removed the first conductor pattern and the second conductor pattern are disconnected such that the third conductor pattern remains connected to the antenna coil section, and when only the third trimming position is removed the first conductor pattern and the second conductor pattern and the third conductor pattern are disconnected such that none of the first, second or third conductor patterns remain connected to the antenna coil section.

* * * * *